March 13, 1962     M. P. MARSH     3,024,752
PLIERS WITH SOLDER HOLDING MEANS
Filed Nov. 21, 1957
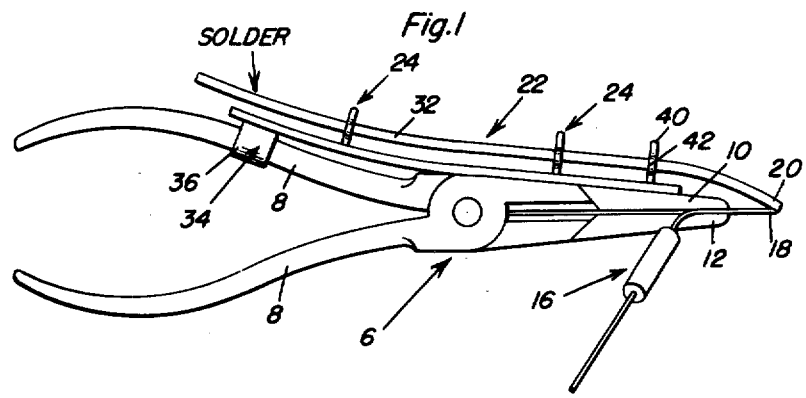
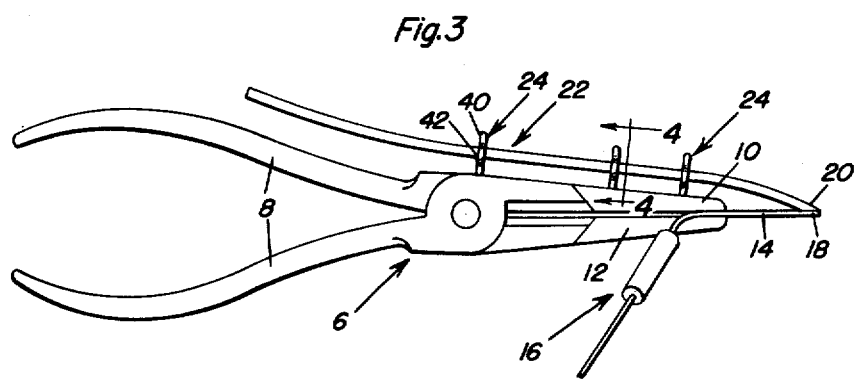
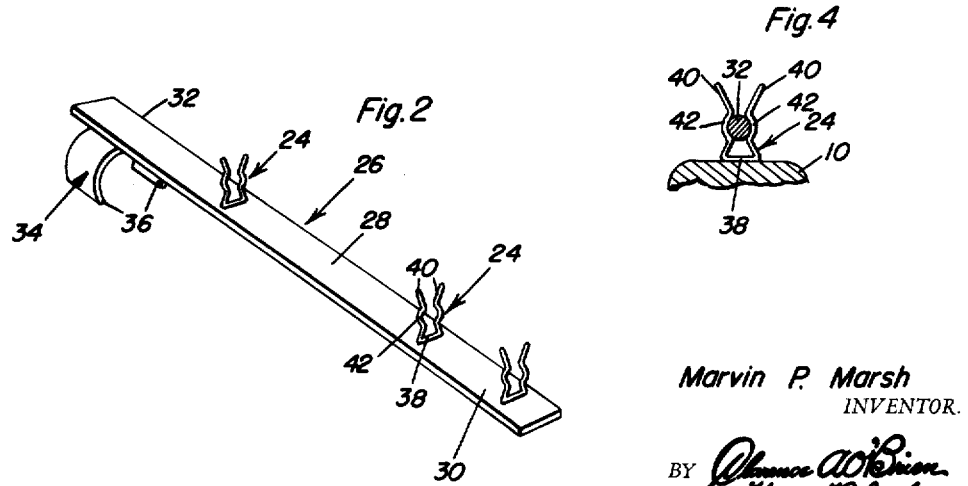
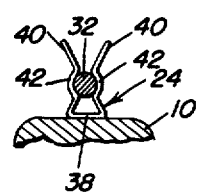
Marvin P. Marsh
INVENTOR.

United States Patent Office 3,024,752
Patented Mar. 13, 1962

3,024,752
PLIERS WITH SOLDER HOLDING MEANS
Marvin P. Marsh, 8129 Lesner Ave., Van Nuys, Calif.
Filed Nov. 21, 1957, Ser. No. 697,875
4 Claims. (Cl. 113—111)

The present invention relates to simple structural means which when properly appropriated and utilized will greatly assist the user in positioning and joining intended end portions of electrical components.

As is a matter of common knowledge the prevailing and endorsed practice is to solder the parts in a now generally well known manner. More specifically the concept has to do with a pair of so-called long nose pliers wherein the jaws serve to grip the lead or end of one electrical component so that it may be put in position to be joined and soldered with a companion lead on another intended component.

It follows that the invention is mainly intended for holding a stick or piece of solder in place so as to bring the solder in proximity to the component being held by the pliers and the place to which the component is to be joined by the melted solder.

Soldering jobs in this category are most commonly met in such electrical components as a resistor, capacitor, transistor, coil, diode, or the like. That is to say, pliers having the invention properly applied, function satisfactorily so that the lead of one component is grasped between the jaws while the stick of solder is held on and operated by one of the jaws. The lead and end of the solder are inter-related and may thus be utilized with requisite certainty and nicety to carry out the complete soldering steps.

Other objects, features and advantages will become more readily apparent from the following description and the accompanying drawing.

In the drawing, wherein like numerals are employed to designate like parts throughout the same:

FIG. 1 is a side elevation of a pair of long nose pliers showing how the same are constructed and used in carrying out the job under consideration, the solder holding means here being in the form of an attachment.

FIG. 2 is a perspective view of the attachment by itself.

FIG. 3 is a view similar to FIG. 1 wherein the solder holding clips, instead of being on an attachable part, are made integral with and constitute a part of one of the jaws of the pliers.

FIG. 4 is a section on the vertical line 4—4 of FIG. 3, looking in the direction of the arrows.

The simpler form of the invention will be uncovered first and for this reason reference is made to FIG. 3. Here the pliers, as an entity, are of the conventional long nose type. The pliers are denoted by the numeral 6 and comprise crossed levers hingedly or pivotally connected together intermediate their ends and providing handles 8 at one end and jaws 10 and 12 at the other end. The jaws are of the aforementioned "long nosed" type. The lead or end portion 14 which is to be soldered to a similar lead on another component (not shown) is an extension of the component itself denoted generally at 16 and it is held between the jaws and extends in the manner shown. The terminal 18 thereof is opposite the terminal 20 on the outer end of the stick or piece of solder 22. Means, broadly stated, is provided on the jaw 10 to hold the stick of solder parallel substantially thereto so that it may be fed along to be held and positioned in the manner shown. More specifically the means comprises a plurality of resilient clips and the clips are preferably of U-shaped form and are individually denoted by the numeral 24. Thus clips, constituting, holding means, serve to locate the solder and workpiece in proper usable relationship.

It is within the purview of the invention to mount the clips directly on the jaw 10 or to provide the clips on an attachment which is connectible with the pliers so that the attachment may lie alongside of the jaw 10. For example as seen in FIG. 2 the attachment is denoted by the numeral 26 and comprises an elongated bar or an equivalent member 28. The end portion 30 resides in the jaw and the left hand end portion 32 is provided with a substantially C-shaped resilient clip or clasp 34. The grips 36 serve to embrace the handle 8 in the manner shown in FIG. 1. In both forms of the invention the stick holding clips 24 are the same. That is to say the bight portion 38 is anchored on the relatively stationary part and the limbs are such that their free or terminal ends 40 are disposed in outwardly divergent relationship. The intermediate portions of the limbs are bent into arcuate form at 42 to conformingly grip the stick of solder.

It is repeated that the invention is not for the express purpose of, but, is mainly for holding a piece of, or length of solder in place, so as to bring the piece of solder in proximity of the component being held by the pliers, and the place to which the component is to be soldered.

Equipped with the invention under advisement any suitable long nose pliers may be used in conjunction with an electrical component (such as a resistor, capacitor, transistor, coil, diode, or the like), may have one of its leads positioned and held in the jaws of the long nose. A piece or stick of solder lying in the distorted U's 42 may then be bent down to contact a part of, or the end of the lead of the component, so that when the component is put into the position or place which it is to be soldered, solder is already present and the person soldering has only then to provide a source of heat at the junction of the three items.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand tool expressly designed and adapted to position hold, and cooperatively coordinate two individual elements, for example, a stick of solder and an electrical component so that the intended terminal end portions thereof are held together in juxtaposed relationship in a manner to cooperate with the end of a third element comprising a pair of pliers having cooperating pivotally connected handles provided at respective outer end portions thereof with gripping jaws, so that the end portion of one of the aforementioned components may be aptly held between the tip ends of the jaws in a manner to project beyond said tip ends, and means cooperable with one of the jaws to support the stick of solder with the stick proper assuming a position in general parallelism with an exterior lengthwise surface of said jaw and the outer tip projecting beyond the terminal end of said jaw, said means embodying a plurality of spaced clips, each clip embodying a bight portion fixed to said lengthwise surface and a pair of resilient grips projecting laterally to the lengthwise axis of said one jaw, said grips being individually resilient and springy and having intermediate portions provided with stick solder seating bends, the bends located opposite each other so as to removably embrace but retain a cooperating portion of said stick of solder.

2. For use in holding a stick of solder on a pair of long-nose pliers; a pliers attachment comprising, in combination, an elongated bendable bar of a length to extend, when in use, alongside and parallel to a selected one of the jaws of the pliers and also alongside and in proximity to a cooperating one of the handles of said pliers, said bar being longer than said one jaw but shorter than the combined length of the said jaw and handle, the lengthwise inner and outer surfaces of said bar being substantially flat and being provided on its inner surface of the bar with a laterally disposed substantially C-shaped resilient clasp, said clasp having grips to embrace a cooperating portion of said one handle and to releasably connect the bar with the handle, and means on said outer side for removably supporting a stick of solder in general parallelism with one of the jaws, said means comprising a plurality of longitudinally spaced U-shaped clips, said clips having resilient grips, said grips being springy and having intermediate opposed bends arranged to removably embrace a cooperating portion of an insertable and removable stick of solder.

3. The structure defined in claim 2 and wherein said C-shaped clasp is located adjacent the inner end of said bar, and said U-shaped clips being confined to the outer end portion of the bar and also the median portion, the U-shaped clip closest to said C-shaped clasp being spaced longitudinally therefrom whereby the outer surface of the bar inwardly thereof is smooth and unobstructed.

4. The structure defined in claim 3 and wherein said bar is rectangular in cross-section, said C-shaped clasp constituting the sole means for attaching and retaining said bar, the entire inner surface of said bar except for the limited portion to which the median part of the C-shaped clasp is connected being free of obstructions and consequentially substantially flat.

References Cited in the file of this patent

UNITED STATES PATENTS

| | | |
|---|---|---|
| 1,286,242 | Cullin | Dec. 3, 1918 |
| 1,319,997 | Galloway et al. | Oct. 28, 1919 |
| 1,332,937 | Van Viersen | Mar. 9, 1920 |
| 1,439,067 | Cole | Dec. 19, 1922 |
| 1,583,596 | Lacklen | May 4, 1926 |
| 2,191,782 | Valane | Feb. 27, 1940 |
| 2,248,359 | Klopfenstein | July 8, 1941 |
| 2,356,400 | Hanson | Aug. 22, 1944 |
| 2,854,564 | Cohen et al. | Sept. 30, 1958 |

FOREIGN PATENTS

| | | |
|---|---|---|
| 109,050 | Australia | Nov. 23, 1929 |